(12) United States Patent
Mueller

(10) Patent No.: US 12,229,817 B2
(45) Date of Patent: Feb. 18, 2025

(54) SYSTEMS AND/OR METHODS FOR PRESENTING DYNAMIC CONTENT FOR ARTICLES OF CLOTHING

(71) Applicant: Knot Standard LLC, New York, NY (US)

(72) Inventor: Matthew Mueller, New York, NY (US)

(73) Assignee: Knot Standard LLC, New York, NY (US)

(*) Notice: Subject to any disclaimer, the term of this patent is extended or adjusted under 35 U.S.C. 154(b) by 0 days.

(21) Appl. No.: 18/111,451

(22) Filed: Feb. 17, 2023

(65) Prior Publication Data

US 2023/0281692 A1    Sep. 7, 2023

Related U.S. Application Data

(63) Continuation of application No. 16/900,281, filed on Jun. 12, 2020, now Pat. No. 11,615,454.
(Continued)

(51) Int. Cl.
*G06Q 30/0601* (2023.01)
*G06F 3/0482* (2013.01)
(Continued)

(52) U.S. Cl.
CPC ....... *G06Q 30/0631* (2013.01); *G06F 3/0482* (2013.01); *G06F 40/186* (2020.01);
(Continued)

(58) Field of Classification Search
CPC .......... G06Q 30/0631; G06Q 30/0185; G06Q 30/0623; G06Q 30/0643; G06Q 30/0226;
(Continued)

(56) References Cited

U.S. PATENT DOCUMENTS

2006/0031128 A1*  2/2006  Lamitie ............. G06Q 30/0603
                                                          705/26.5
2008/0173716 A1   7/2008  Itagaki
(Continued)

OTHER PUBLICATIONS

International Search Report and Written Opinion issued on Aug. 20, 2020 in corresponding International Application No. PCT/US2020/037460, 14 pages.

*Primary Examiner* — Paul Danneman
(74) *Attorney, Agent, or Firm* — Nixon & Vanderhye PC

(57) ABSTRACT

Certain example embodiments described herein relate to systems and/or methods for presenting user-interactive, dynamically-generated contextual content for individual articles of clothing. A QR or other code is provided to the article of clothing. The QR or other code is scannable by an electronic device, causing the electronic device to access a webpage or the like. The webpage (or similar information display) includes information typically found on a tag or label, together with additional dynamically-generated and organized content relevant to the article and/or person for whom the article was made. The techniques described herein are usable in connection with mass-produced, small batch/boutique items, as well as custom articles of clothing. Thus, it becomes possible to quickly and easily convey a broad scope of information about an article of clothing directly from that article of clothing, without having to include large and potentially irritating tags or labels.

20 Claims, 24 Drawing Sheets

Related U.S. Application Data

(60) Provisional application No. 62/860,846, filed on Jun. 13, 2019.

(51) Int. Cl.
*G06F 40/186* (2020.01)
*G06K 7/10* (2006.01)
*G06K 7/14* (2006.01)
*G06Q 30/018* (2023.01)
*G06Q 30/0226* (2023.01)
*G06T 17/00* (2006.01)

(52) U.S. Cl.
CPC ....... *G06K 7/10722* (2013.01); *G06K 7/1417* (2013.01); *G06Q 30/0185* (2013.01); *G06Q 30/0623* (2013.01); *G06Q 30/0643* (2013.01); *G06T 17/00* (2013.01); *G06Q 30/0226* (2013.01)

(58) Field of Classification Search
CPC . G06F 40/186; G06F 3/0482; G06K 7/10722; G06K 7/1417; G06T 17/00
See application file for complete search history.

(56) References Cited

U.S. PATENT DOCUMENTS

| | | |
|---|---|---|
| 2010/0030578 A1 | 2/2010 | Siddique |
| 2011/0184832 A1 | 7/2011 | Wannier et al. |
| 2012/0085828 A1 | 4/2012 | Ziegler |
| 2014/0358738 A1* | 12/2014 | Ohnemus ........... G06Q 30/0601 705/27.2 |
| 2016/0091874 A1 | 3/2016 | Colett et al. |
| 2017/0076011 A1 | 3/2017 | Gannon |
| 2019/0355041 A1* | 11/2019 | Sewak ............... G06Q 30/0643 |
| 2020/0394699 A1 | 12/2020 | Mueller |
| 2022/0222740 A1* | 7/2022 | Beckham ........... G07F 17/0014 |

* cited by examiner

FABRICS

2015-10-19 D7M3
Canclini Shirt
Canclini
0801W0180101
Liner
MKSN-D7M3-3

2018-08-28 E443
Canclini Shirt
Canclini
0680W24210001
Liner
MKSW-E443-5

2015-10-19 HAK3
Canclini Shirt
Canclini
2331W0120013
Liner
MKS-HAK3-1

2015-10-19 HAK3
Canclini Shirt
Canclini
2331W22410002
Liner
MKS-HAK3-2

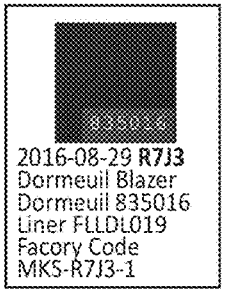

2016-08-29 R7J3
Dormeuil Blazer
Dormeuil 835016
Liner FLLDL019
Facory Code
MKS-R7J3-1

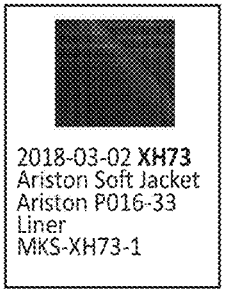

2018-03-02 XH73
Ariston Soft Jacket
Ariston P016-33
Liner
MKS-XH73-1

2016-07-13 7CJW
Loro Piana Suit
Loro Piana 620037
Liner KYFLLMKS007
Factory Code
MKSN-7CJW-1

2015-10-19 XWKW
Loro Piana Blazer
Loro Piana 648012
Liner FLL86742-2
Factory Code
MKS-XWKW-3

2018-03-02 F6W9
Ariston Soft Jacket
Ariston P105-14
Liner
MKS-F6W9-6

2018-03-02 F6W9
Loro Piana Soft Jacket
Loro Piana 695001
Liner
MKS-F6W9-7

2016-03-29 D7M3
Loro Piana Blazer
Loro Piana 687010
Liner FLL623-113
Factory Code
MKSN-D7M3-1R

2018-08-07 E443
Loro Piana Blazer
Loro Piana 687011
Liner FLLDL098
Factory Code
MKSW-E443-2

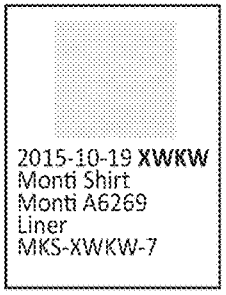

2015-10-19 XWKW
Monti Shirt
Monti A6269
Liner
MKS-XWKW-7

2015-10-19 XWKW
Monti Shirt
Monti A6260
Liner
MKS-XWKW-8

2015-10-19 XWKW
Monti Shirt
Monti A6168
Liner
MKS-XWKW-11

2015-10-19 XWKW
Monti Shirt
Monti A6193
Liner
MKS-XWKW-12

2015-10-19 HAK3
Thomas Mason Shirt
Thomas Mason
FM304594-1070
Liner
MKS-HAK3-5

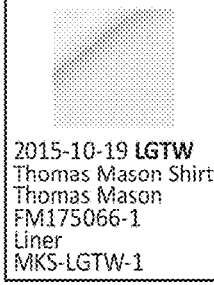

2015-10-19 LGTW
Thomas Mason Shirt
Thomas Mason
FM175066-1
Liner
MKS-LGTW-1

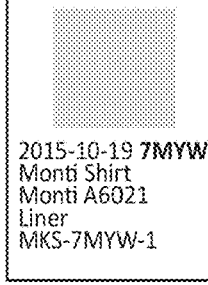

2015-10-19 7MYW
Monti Shirt
Monti A6021
Liner
MKS-7MYW-1

2013-08-15 AQJW
Solbiati Shirt
Solbiati S06046
Liner
MKS-AQJW-1

Fig. 2

| STYLE | | | | | | | |
|---|---|---|---|---|---|---|---|
| ELTON BRAND | Navy/Blue | Grey | Naturals | Black | Stripe | Micro-Pattern | Patterned |
| Business Suit | Owned from KS | Owned from KS | Owned from KS | Does Not Want | | Owned from KS | Does Not Want |
| Event Suit / Soft Suit | | | | | | | |
| Jacket | Owned from KS | | Wants from KS | | | Wants from KS | Owned from KS |
| Business Trousers | | | | | | | |
| Casual Pant | Owned from KS | | Owned from KS | | | | |
| Business Shirt | Owned from KS | Owned from KS | Owned from KS | | | Wants from KS | Owned from KS |
| Casual Shirt | | | | | | | |
| Outerwear | Wants from KS | Wants from KS | | | | | |
| Knitwear | | | Wants from KS | | | | |
| Black Tie | | | | Wants from KS | | | |

FROM EMAILS & SURVEYS

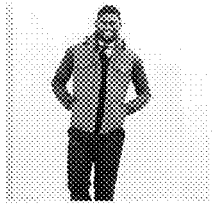
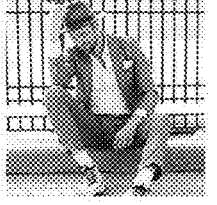
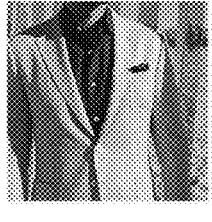
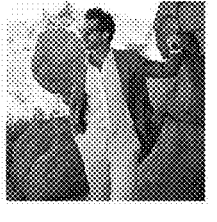
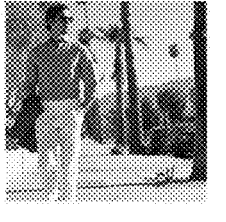

BRANDS

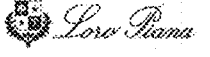

Fig. 3

ORDER HISTORY

YOUR STYLIST:
Dayne

YOUR SHOWROOM:
Washington, D.C.

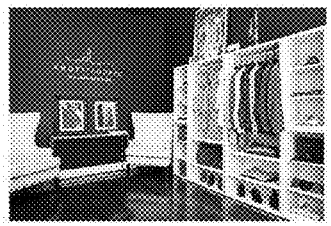

IN PROGRESS

| | | |
|---|---|---|
| APRIL 16TH, 2019 | Petrol 1/4 Zip Mock Sweater | Est. May 15th |
| | Loro Piana Glen Plaid Jacket | Est. May 17th |
| | Navy Moleskin Field Jacket | Est. May 17th |

DELIVERED

| | | |
|---|---|---|
| NOVEMBER 30, 2018 | Cream Crewneck Sweater | Delivered Jan 15th |
| | Blue & Brown Check Shirt | Delivered Dec. 28th |
| SEPTEMBER 6, 2018 | Dormeuil Off White Corduroys | Delivered Oct 8th |
| | Dormeuil Exel Blue Trousers | Delivered Oct 8th |
| APRIL 29, 2018 | Loro Piana Mare Trousers | Delivered May 16th |
| | Montio Luster IV Classic Shirt | Delivered May 16th |
| | Dorsilk Classic Blazer | Delivered May 16th |
| DECEMBER 20, 2017 | Snowy River Lightweight Suit | Delivered Feb 2nd |
| | Signature Overcoat | Delivered Jan 15th |

Fig. 4

| SHOP | APPOINTMENTS | CUSTOMIZE | KNOTSTANDARD | SERVICE | OCCASIONS | OUR STANDARD |

HOW TO WEAR IT    CARE INSTRUCTIONS    ABOUT

CARE INSTRUCTIONS FOR WOOL FABRICS

Your Knot Standard garment is made from an extremely fine woven fabric, and it is important to take proper care of your creation. Professional cleaning should be used only when absolutely necessary and wear should be limited to two times per week to improve garment longevity.

1

Your suit should only be dry-cleaned when absoluted necessary. 2-4 times per year is appropriate for normal climates.

2

Investing in a wood bristle brush to remove dry stains and dust greatly increases your suit's longevity. The act of brushing will also refresh the natural sheen of the fabric - be sure to brush lengthways or in the direction of the weave.

3

Any other stains should be removed promptly - baby wipes are one of the safest and most effective alternatives.

4

Always keep your suit hanging, uncovered in a dry location where it can "breathe". This keeps the jacket shape intact, minimizes wrinkling, and eliminates any chemical smell that may come from the garment bag. Be sure to hang the pants properly to keep the crease of the pants intact.

5

Allow wool suits to hang for at least 24 hours in between wearing. This will help the wrinkles fall out, and restore the original shape of the suit.

[ HOMEPAGE > ]

Fig. 6

CUSTOMIZATIONS:

3-Button Jacket (Rolled to 2nd)
Notch Lapel, 9cm
Patch Pockets
Double Vent
Pick Stitching
Barchetta Pocket
Dark Grey Mother of Pearl Buttons
Unlined
Deconstructed Shoulders

SHARE

Fig. 7C

TELL YOUR FRIENDS
*and be rewarded*

REFERRAL

Name

Email or Phone Number

REFERRAL

Name

Email or Phone Number

Add new Referrral

SUBMIT

HOMEPAGE>

Fig. 8E

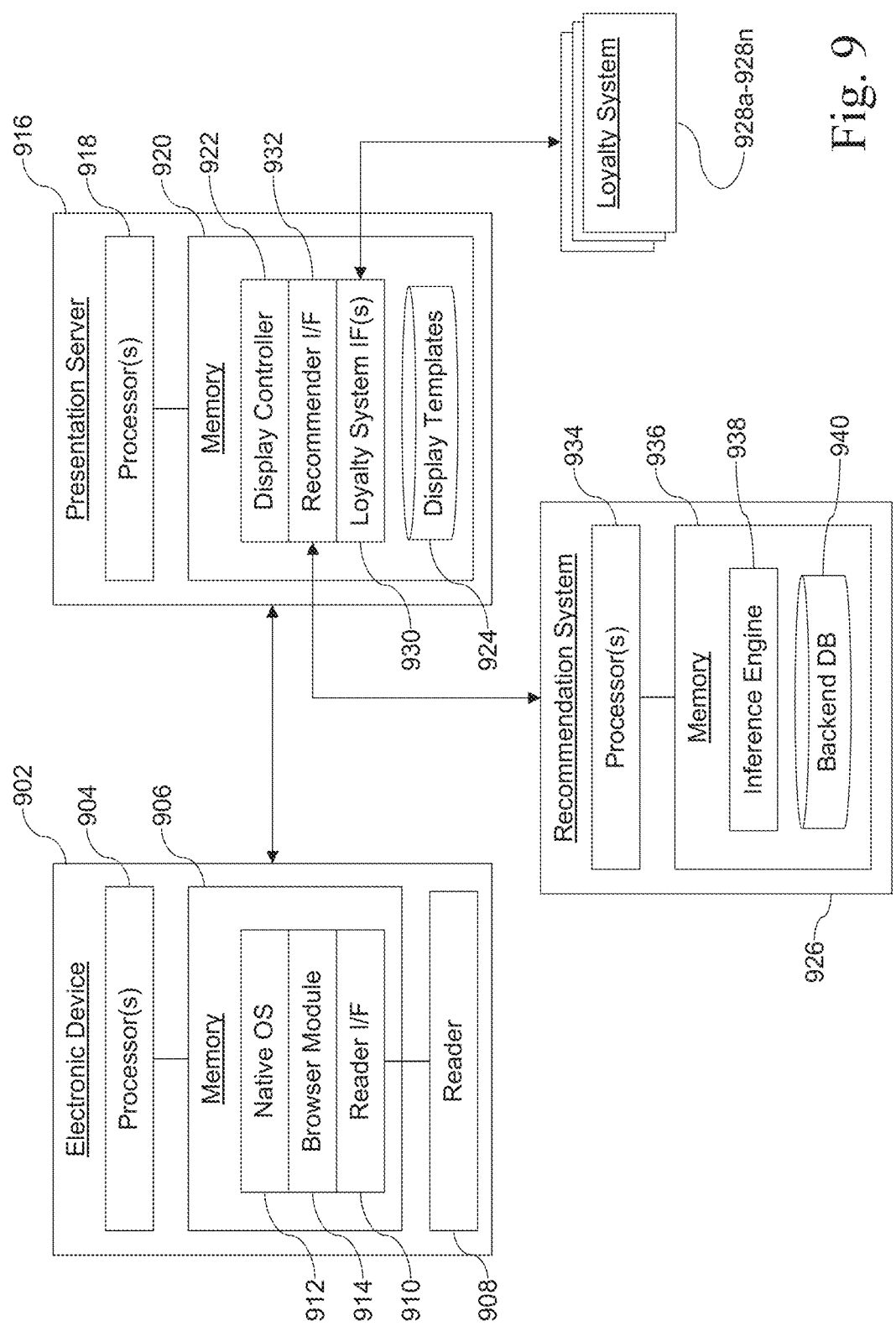

SYSTEMS AND/OR METHODS FOR PRESENTING DYNAMIC CONTENT FOR ARTICLES OF CLOTHING

CROSS-REFERENCE TO RELATED APPLICATION

This application is a continuation of U.S. application Ser. No. 16/900,281 filed Jun. 12, 2020, which claims the benefit of U.S. Application Ser. No. 62/860,846 filed on Jun. 13, 2019, the entire contents of each of which are hereby incorporated herein by reference.

TECHNICAL FIELD

Certain example embodiments described herein relate to systems and/or methods for presenting user-interactive, dynamically-generated contextual content for individual articles of clothing.

BACKGROUND AND SUMMARY

Articles of clothing purchased online and at stores typically is produced in large batches. It is not uncommon, for example, to have tens of thousands of t-shirts manufactured for a given retailer for a single season. Even so-called "boutique" items typically are produced in smaller batches.

The centralized and large-scale operations used to produce such articles of clothing are well adapted to inserting tags or labels on clothing. Indeed, these tags or labels also can be mass produced and sewn into or otherwise attached to individual articles in batches. As is familiar, these labels tend to indicate brand and convey information such as, for example, care instructions (e.g., whether a shirt should be washed in warm water with like colors, ironing is appropriate, dry cleaning is recommended, etc.). Tags or labels also tend to indicate the material(s) used in manufacturing. This material information oftentimes is simple (e.g., 100% cotton t-shirts or some other specified percentage blend of cotton and other material(s)) or complex (e.g., with different materials being specified for at least some different parts of an article like a jacket, for example, including it outer shell, inner lining, etc.). And some labels indicate the country in which the article was manufactured.

Unfortunately, the amount of space available on such tags and labels frequently is quite limited. This limited space in turn limits the amount of information that can be provided and can, for example, cause text or icons to be produced in small text that can be difficult to read. Although it is possible to enlarge and/or provide labels, doing so can become an irritation to the person wearing the article of clothing. Indeed, many people remove the tags or labels from their clothing for this purpose. The removal of the tags or labels is likely to result in the loss of this information.

Recently, there has been a trend to "tell stories" about articles of clothing. For example, some manufacturers tells stories about how their articles of clothing are expected to perform (e.g., for specialty purposes like rock climbing), how a given article compares to other articles in a clothing line (e.g., in terms of warmth provided), where materials were sourced from and/or how they were sustainably sourced, etc. This information typically is provided on auxiliary tags or labels that are removed before they are worn. This information thus also is likely to be lost.

Truly custom clothing differs quite markedly. Because it is custom, only one item may be made at a time, or one batch of items for one particular person may be made at one time. Thus, the tags or labels that are included oftentimes reflect the company that tailored the article, and perhaps the person's name and the fabric line or mill used to produce it. Sometimes, custom clothing manufacturers will sew into such clothing labels with codes related to the manufacturing. These codes may indicate order or manufacture dates, sizes, customizations, and/or the like. Yet the coded information embedded in such labels generally is not understandable to the person for whom the article was made. Furthermore, such labels with coded information oftentimes are meant to be used during the manufacturing process only, so they quite often are sewed into areas that will not be easily accessible to the person (e.g., inside an inner pocket on a blazer, above the thigh on a pair of trousers, etc.). This placement is advantageous because it does not affect the comfort of the article. But in such instances, even if the information were understandable, it would not be easily accessible.

It will be appreciated that it would be desirable to help address the above-identified and/or other problems. For example, it will be appreciated that it would be desirable to quickly and easily convey a broad scope of information about an article of clothing directly from that article of clothing, without having to include large and potentially irritating tags or labels. It will be appreciated that it would be desirable to provide this information for mass-produced articles, as well as small batch and custom clothing as well.

One aspect of certain example embodiments relates to helping to address the above-described and/or other issues. For example, one aspect of certain example embodiments relates to systems and/or methods for quickly and easily conveying a broad scope of information about an article of clothing directly from that article of clothing, without having to include large and potentially irritating tags or labels therein or thereon. In certain example embodiments, a QR or other code is provided to the article of clothing. The QR or other code is scannable by a smart device, causing the smart device to access a webpage or the like. The webpage (or similar information display) includes information typically found on a tag or label, together with additional dynamically-generated and organized content relevant to the article and/or person for whom the article was made. The techniques described herein are usable in connection with mass-produced, small batch/boutique items, as well as custom articles of clothing.

In certain example embodiments, a dynamic content presentation system is provided. A reader (e.g., a camera provided to an electronic device or the like) is configured to read a code provided to an article of clothing. A transceiver configured to transmit the read code to a sever. Processing resources (which may be incorporated into an electronic device such as a smartphone, tablet, or computer), including at least one processor and a memory coupled thereto, are configured to present a user interface. The user interface is configured to display output from the server, with the output including care instructions for the article of clothing and one or more recommendations of one or more other articles of clothing that match with the article of clothing to which the code is provided.

In addition to the features of the previous paragraphs, counterpart methods, non-transitory computer readable storage media tangibly storing instructions for performing such methods, executable computer programs, and the like, are contemplated herein, as well.

According to certain example embodiments, the code may be a QR code. The code may be sewn into or printed onto the article of clothing itself or a tag affixed to the article of clothing.

According to certain example embodiments, the user interface may be provided in connection with a webpage. The webpage may be formatted so that the recommendation(s) is/are provided in a predefined template, for example.

In certain example embodiments, multiple recommendations may be provided. For instance, at least some recommendations may be presented as a series of one or more images and/or videos retrieved from a library stored to a non-transitory computer readable storage medium and/or generated using 3D modelling; presented as or otherwise incorporated into as a style board incorporating images of plural products; etc.

In certain example embodiments, information presentable via the user interface may include customization, material sourcing, construction, and/or other information associated with the article of clothing.

The article of clothing from which the code is read may be a custom article of clothing or a mass-produced article of clothing in different instances.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 2 shows fabric information for fabrics included in articles purchased by a hypothetical user, the fabric information having been retrieved from a database usable in connection with certain example embodiments;

FIG. 3 shows styling information for articles purchased, or otherwise being indicated as being preferred, by the hypothetical user, the styling information having been retrieved from the database usable in connection with certain example embodiments;

FIG. 4 shows order information for the hypothetical user, the order information having been retrieved from the database usable in connection with certain example embodiments;

FIG. 6 shows an example formatted care instructions page, in accordance with certain example embodiments;

FIGS. 7A-7C show successive areas of a formatted garment information page, in accordance with certain example embodiments;

FIGS. 8A-8E show successive areas of a "share" page, in accordance with certain example embodiments; and FIG. 9 is a block diagram of a dynamic content presentation system in accordance with certain example embodiments.

DETAILED DESCRIPTION

Certain example embodiments described herein relate to systems and/or methods for presenting user-interactive, dynamically-generated contextual content for individual articles of clothing. A QR or other code is provided to the article of clothing. The QR or other code is scannable by a smart device (e.g., a smartphone, tablet, or the like) or other electronic device (e.g., a computer), causing the smart device to access a webpage or other structured information display. The webpage (or similar information display) includes information typically found on a tag or label, together with additional dynamically-generated and organized content relevant to the article and/or person for whom the article was made. The techniques described herein are usable in connection with mass-produced, small batch/boutique items, as well as custom articles of clothing. Thus, it becomes possible to quickly and easily convey a broad scope of information about an article of clothing directly from that article of clothing, without having to include large and potentially irritating tags or labels.

Figure 1:
FIG. 1 is an image of a QR code sewn into a jacket, in accordance with certain example embodiments.

Referring now more particularly to the drawings, FIG. 1 is an image of a QR code sewn into a jacket, in accordance with certain example embodiments. The FIG. 1 example QR code is sewn into the fabric on the inside of the jacket. By simply opening the jacket partly, the QR code can be quickly and easily scanned using a smart device (such as a smartphone, tablet, or the like) or other electronic device (such as a laptop computer or the like). Because the QR code is sewn into the fabric using fabric in this example, it is unlikely to irritate the person wearing the article of clothing. It is relatively small in size so as to be visually unobtrusive, even though it is positioned in an easy-to-access (and potentially easy-to-scan/easy-to-electronically-read) location. The coloration of the code (including the material) can be selected to complement the article of clothing or blend in, depending on the style selected, provided that the contrast is sufficient to enable it to be scanned or otherwise read via electronic imaging or other means.

QR codes are advantageous, as some modern smart devices incorporate native QR code scanning and processing functionality. For instance, some smartphones are able to use their cameras to scan QR codes and process the information retrieved. As will be appreciated from the description that follows, this may include decoding an identifier and/or other information from the QR code and then opening a website or other information display vehicle, with that identifier being passed along to the website or the like. The website or other structured information display may use the identifier to dynamically generate content as described in greater detail below. It may be presented via a native browser running on the device, through a dedicated software application or app running on the device, etc. The scanning of the code may, for example, open the browser or software application and automatically navigate the user to a webpage or other structured information display, as disclosed in greater detail below.

As noted above, the QR code embeds identification information. This identification information uniquely identifies the product. For mass-produced articles, for example, the identification information may indicate that the QR code is associated with a red shirt manufactured by Brand X, of which 20,000 were produced in the current year. For custom clothing, however, the identification information may uniquely identify the individual article and potentially also the person for whom the individual article was manufactured. In some instances, this ownership information may be embedded directly in the QR code. In other instances, it may be retrieved based on the unique identifier of the article. That is, a backend database or the like may store associations between unique article identifiers and customer identifiers, and there may be a one-to-one or many-to-one relationship between the former and the latter.

In both custom and non-custom scenarios, a backend database may include information about the article such as, for example, the material from which it was constructed, its basic design and aesthetic appearance, care instructions, and/or the like. One or more pictures of the article may be accessible using information stored to the backend database. In certain example embodiments, the image may be photographed as it is produced (e.g., via a camera positioned on the manufacturing line), prior to being packed or shipped, etc. Images may be collected in custom and non-custom scenarios. For non-custom clothing, for example, one or more representative images may be collected (e.g., one or more sets of images for each size produced), rather than gathering images for all products produced. The image may be uploaded to the backend database, regardless of how or when it is photographed.

It will be appreciated that additional, more personal user and/or profile information may be retrievable for both custom and non-custom scenarios. In the custom clothing scenario, for example, this information may be stored in the backend database using the linkage noted above. In the custom context, this information may be an extremely rich source of data indicating, for example, information about all prior purchases including what was purchased and how it was customized, demographic information, stated and inferred preferences, purchase times, value of the relationship, etc. Further information is provided below.

In the non-custom scenario, however, this more personal user and/or profile information may still be retrievable, e.g., provided that the user has participated in a brand loyalty or other customer-tracking program. Such programs may store information about users including, for example, basic demographic information, purchase history, and/or the like. The QR code for non-custom scenarios may link to a website or the like, requesting that the user log in to a brand loyalty or other customer-tracking program. In some instances, depending on permissions granted to the smart device or the like, login credentials may be automatically passed to the program website to make login easier. Brand loyalty or other customer-tracking program computer systems may be updated from point-of-sale (POS) or point-of-purchase (POP) systems as items are procured, e.g., by having a clerk enter identifying information about a user (e.g., an email address, customer identifier, or the like), thereby facilitating the association between the user and the item of clothing. The presentation system of certain example embodiments may interface with these brand loyalty or other customer-tracking program systems using this or other identifying information.

The recommendations described below thus may take into account customer information such as, for example, demographic information including age, what has been ordered/purchased, what customizations have been made in the past, what colors have been ordered/purchased, what fabrics and fabric grades have been selected/purchased, etc. Additional information intuited about the user also may be included in these and/or other respects. This information also may be encapsulated in a style grid, resulting in a heat map of what is liked and not liked, what is owned and not owned, etc.

FIGS. 2-4 visually show user-specific information about a customer that may be retrieved from the backend database in certain example embodiments. Some or all of the information conveyed in these drawings may be presented to a user. It will be appreciated that the accuracy and granularity of this information may depend on, for example, whether a custom or non-custom scenario is involved. In this regard, as noted above, the data may be richer for custom scenarios and, thus, more information may be tracked, processed, and presented.

In greater detail, FIG. 2 shows fabric information for fabrics included in articles purchased by a hypothetical user, the fabric information having been retrieved from a database usable in connection with certain example embodiments. The FIG. 2 fabric information includes swatches for each owned article of clothing. Associated with the swatches is information about the individual items. For instance, order date, short product description, factory code, identifier embedding customization information in the case of custom clothing, etc., is shown.

FIG. 3 shows styling information for articles purchased, or otherwise being indicated as being preferred, by the hypothetical user, the styling information having been retrieved from the database usable in connection with certain example embodiments. FIG. 3 includes a grid, with the vertical axis listing "staple" articles of clothing and the horizontal axis listing basic "staple" colors or patterns. The individual cells in the table here indicate whether the user already owns the article of clothing ("KS" here stands for Knot Standard, the assignee of the instant application), and whether the user has expressed a preference as to wanting or not wanting a particular item. It will be appreciated that at least some of this information (including the already purchased indicators) may be available for both custom and non-custom scenarios. Even in non-custom scenarios, algorithms may infer that an item likely is wanted or not wanted based on product returns, relative dwell time on product pages in browser windows, repeat visits to product pages, search history, whether items have been added to online shopping carts but not purchased, and/or the like.

In the custom design scenario, basic design information may define basic staples of clothing such as, for example, those provided on the vertical axis of the table in FIG. 3. Customizations may be defined as a series of layers added onto the basic design for the default garment type. For example, there is a wide variety of customizations applicable to sport jackets including, for example, lapel type, vent types, lining type, whether stitching is present, whether buttons on sleeves are functional, whether ticket pockets are included, how many interior pockets are provided and where they are located, etc. These customizations are, of course, exclusive of colors, patterns, fabric types, and much more. The use of layers simplifies styling selections by operating at different levels of granularities. These layers for styling at different granularities may include, for example, layers for the time of year (e.g., implying summer-weight suits, flannel suits, three-season suits, etc.), fabric, construction (e.g., presence and/or amount of padding, etc.), styling, where/how worn (e.g., work, casual, or other purposes), geographical location (e.g., the city in which the person resides), durability, visual patterning (e.g., for matching with other articles in accordance with a major/minor/major or other common patterning regime, etc.), how it fits in or complements the existing wardrobe, and so on. Yet another layer may indicate, for example, how "expressive" the person and/or stylist is/are with clothing choices, reflecting comfort in decision-making and styling decisions, etc. This information may be stored in the database and used to power recommendation engines, as noted in greater detail below.

Below the grid is a series of images showing styles that the user has expressly or impliedly shown interest in, e.g., via a direct statement to a clothier, completion of a survey, clicking on an email link, and/or the like. Electronic feedback may be gathered from or on behalf of the user and tracked accordingly, e.g., in the backend database. These images show outfit collections and thus are helpful to provide an overall sense of style. The brand logos provided below the images convey similar information and may be gathered in the same or similar ways. Additional information about fit may be intuited from this information. For example, some tailors solicit feedback about fit by asking for information about how a suit feels, while others are comfortable sharing such information in-person or via surveys. Information indicating whether a more tailored fit might be reflected in images showing more tapered legs and higher in-seems on pants. Other information such as armholes being too tight may be recorded in the database but not readily shown.

FIG. 4 shows order information for the hypothetical user, the order information having been retrieved from the database usable in connection with certain example embodiments. For example, FIG. 4 includes a picture and link to a personal stylist, along with a picture and link to a local showroom. This showroom information may be based on a "home" showroom where the person normally shops, or it may be based on a current location (e.g., gathered by a GPS device of the smartphone reading the QR code or the like). The order information below that may show information about articles of clothing already ordered and/or purchased. Here, the information includes an order/purchase date, a short description of the article, and the date delivered. Clicking on or otherwise selecting an item may provide product information related to the particular selection.

The backend database may be structured as a relational database, object-oriented database, and/or the like. XML, JSON, and/or other like technologies may be used for structuring all or parts of the backend database, e.g., facilitating the easy tagging of articles to enable the example functionality described herein.

Based on the information provided above, it will be appreciated that the backend database can be used to provide information about the product, material, basic design of the garment, specific customization decisions for the garment in the custom clothing scenario, a link to care instructions, client history, and/or the like. Thus, certain example embodiments "know" specifics about the article of clothing and potentially also specifics about the person who owns it. Some or all of the garment- and/or user-specific information can be used to generate dynamic displays with the information typically provided on tags or labels, supplemented by much more information—even in non-custom mass production scenarios.

As noted above, scanning a QR code may take the person to a landing page (whether visible through a browser or a dedicated application) or the like. The unique identifier of the article is decoded and transmitted, potentially along with a URL, to a native browser of the electronic device (which may be, for example, a smartphone, tablet, laptop, etc.). The web server receives the identifier and identifies the product and potentially also the user. The landing page enables the user to access information about the article, as well as additional dynamically-generated content.

FIGS. 5A-5F show successive areas of an example formatted landing page, in accordance with certain example embodiments. The landing page here provides information about how to wear the particular article associated with the QR code that is scanned. The QR code identifies the product. The product may have tags associated with it. These tags may indicate what the article is, as well as information about its color, style, etc. In this example, the article is a blazer. It is a blue and lightly textured. Its style is casual, and it has brown buttons.

This information, and potentially information about the owner that may be retrieved by looking up the user associated with the article in the custom context or receiving user information from a brand or program loyalty interface, may be provided to a recommendation engine (such as that used by the assignee). Personal preference information thus may be included. It will be appreciated that the recommendation engine may receive input weighting, or may have its output weighted, to reflect recommendations to promote new styles, a color of the season, popular orders, etc. The recommendation engine may determine what other articles of clothing and/or products may match with the identified garment. Thus, some or all of the garment- and/or user-specific information (including that reflected in, and discussed in connection with, FIGS. 2-4) can be provided to a recommendation engine (such as that provided by the assignee of the instant invention) to provide additional content. This additional, dynamically-generated content may be indicative of how the scanned item can be worn.

In certain example embodiments, the recommendation engine may be run multiple times. For instance, in a first run, the recommendation engine may be used to generate one or more sets of recommended individual articles to wear with the scanned article. For example, for a scanned jacket, the recommendation engine in this first run might produce one or more sets of recommended articles, with each set potentially including a shirt, pants, shoes, a belt, etc. In a second run, the recommendation engine may be used to generate one or more other complete or partial matched outfits that include an article of clothing similar to, but not the same as, the scanned article. For example, a second run might produce a navy herringbone suit, which would be similar to the blue sharkskin example blazer that includes the QR code that is canned. Thus, different runs may produce different types of results, but still may be tailored for the individual.

The output from the recommendation engine may be presented in any suitable format. For instance, both "base recommendations" about individual articles, and outfit pairings, may be sorted by strength of recommendation and/or one or more of the following and/or other factors: similarity to subsequent items displayed, similarity to the scanned article, appropriateness for current or upcoming season, occasion, fabric, price, estimated delivery time, etc. In some instances, it may be desirable to show other looks together with, or in place of, displays for fabric, season, delivery time, etc. Thus, recommendations may be reordered relative to a strict score or match, e.g., as produced by the recommendation engine.

A template additionally or alternatively may be used to structure the output. The template may, for example, be designed to help group the output of the recommendation engine by outfit pairings that show various versions of how one might pair one article of clothing with another (e.g., by putting articles that might be worn together next to each other). For instance, the example shown in FIGS. 5A-5F provides output in accordance with an example template that includes a style board, an image with a model wearing items similar to or corresponding with the style board content, an image with a model wearing more formal items determined by the recommendation engine, two images with models wearing seasonally-appropriate selections determined by the recommendation engine, and a final image with a model showing a formal outfit determined by the recommendation engine. More or fewer of each template entry may be provided in different examples.

The output from the recommendation engine may be a series of product identifiers and/or product tags. The identifiers may point to already-manufactured or predefined products (e.g., mass-produced garments, accessories that generally cannot be customized, "canned" or "stock" custom clothing, etc.) in some instances. In other instances, the tags may identify different garment types and different features of interest, e.g., with different levels or layers of customizations (e.g., pants, casual, flat-front, no-cuff, dark brown, etc.). This information may or may not have meaning to a casual user. Thus, as will be appreciated from the FIG. 5A-5F example, certain example embodiments may provide visual images arranged in the manner determined to be appropriate, e.g., using one of the above-described and/or other organizational approaches. This may be possible in some instances as a separate library of tagged images and/or videos may be maintained. In certain example embodiments, entries in this library may be referenced by product identifier where possible. In certain example embodiments, a search may be performed to identify the image that matches most closely with the determined tags. These tagged images thus may be referenced based on output from the recommendation engine.

In certain example embodiments, it is possible to generate output imagery "from scratch." For instance, a 3D model may be generated and rendered. Optionally, the model may be animated (e.g., in the form of a 32 slice animated GIF or the like). The rendering may be performed in accordance with the tags from the recommendation engine. In certain example embodiments, user information may be taken into account, e.g., so that the model reflects the body type, measurements, and/or other preferences of the user.

Figure 5A:
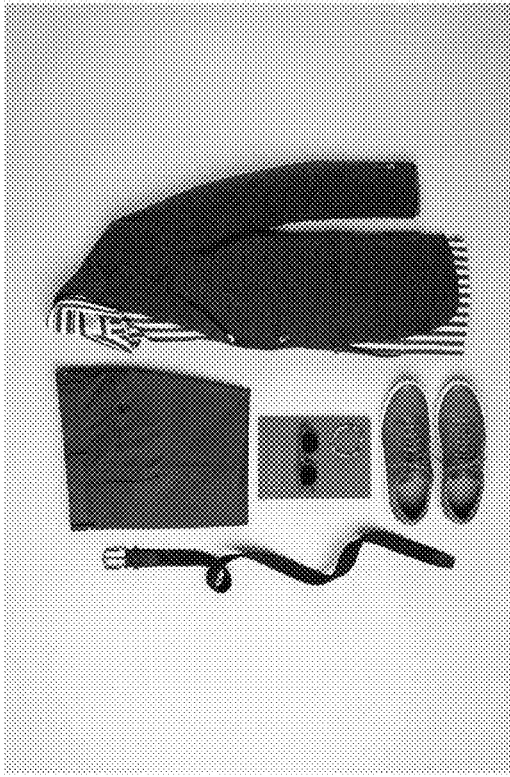
FIGS. 5A-5F show successive areas of an example formatted landing page, in accordance with certain example embodiments.

Referring more particularly to FIG. 5A, a style board is shown. The style board includes an image for the jacket associated with the scanned QR code. A matching shirt is shown therewith, based on stock imagery retrieved from the library. Output from the recommendation engine includes indications relating to a pair of brown pants, brown casual shoes with a coordinating belt, and several other accessories or lifestyle products. The style board itself may be a template, with the various items being locatable therein in accordance with the template. In certain example embodiments, the template may be selected from a plurality of possible templates, e.g., depending on the output from the recommendation engine. That is, if the recommendation engine does not output shoes, a template prominently features shoes would be omitted. Similarly, if the recommendation engine produces output indicative of the user's preference for having many different pairs of shoes, a template including multiple slots for shoes may be selected. If the landing page template as a whole is to include multiple templatized style boards, the same or different templatized style boards may be used therein to promote consistency, interest, or the like.

Figure 5B:
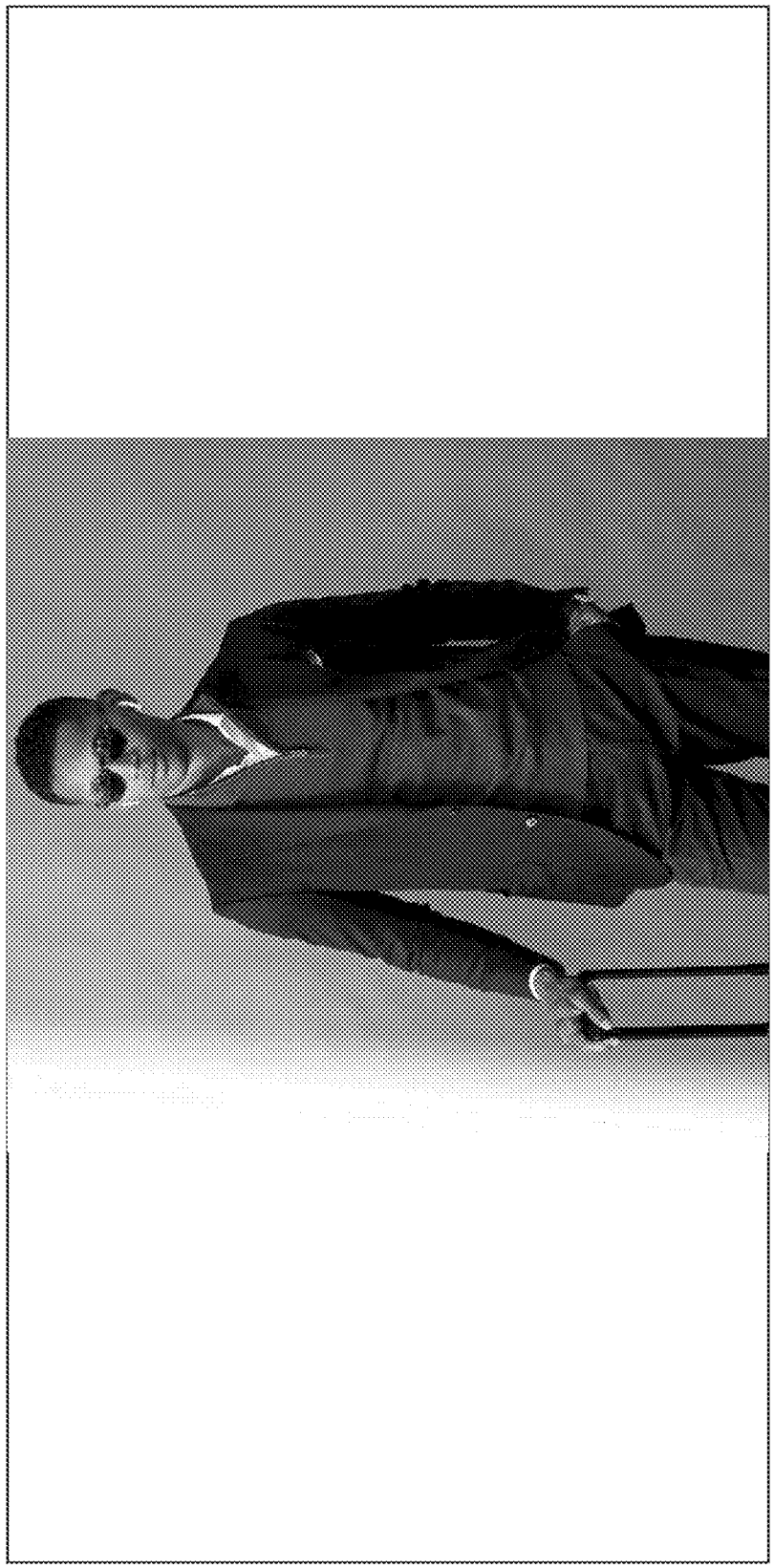

FIG. 5B maintains some consistency with FIG. 5A, in that the same or similar jacket and pants are shown. However, different styling elements are included. These include solid shirt with a half-zip sweater. Further accessories (including sunglasses, a suitcase, etc.) are shown, and "hints" are provided for a watch and a pocket square. It thus will be appreciated from FIGS. 5A-5B, for example, that the output from the recommendation engine in certain example embodiments can be indications relating to a custom suit, accessories, or other items from partners or others. This may include belts, shoes, watches, etc., as well as lifestyle items (e.g., cars, electronics, art, briefcases, food, alcohol such as scotch or wine, etc.).

Figure 5C:
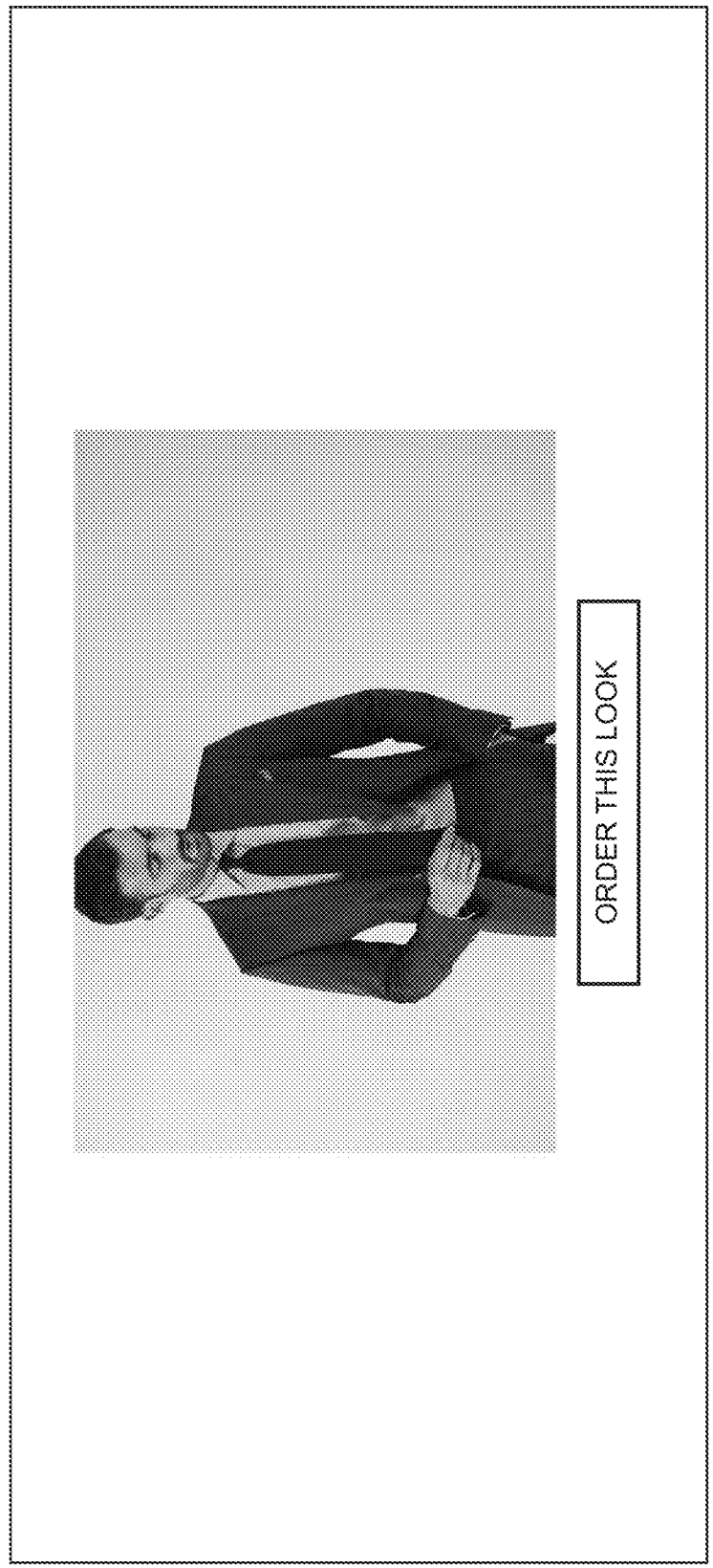
Figure 5D:
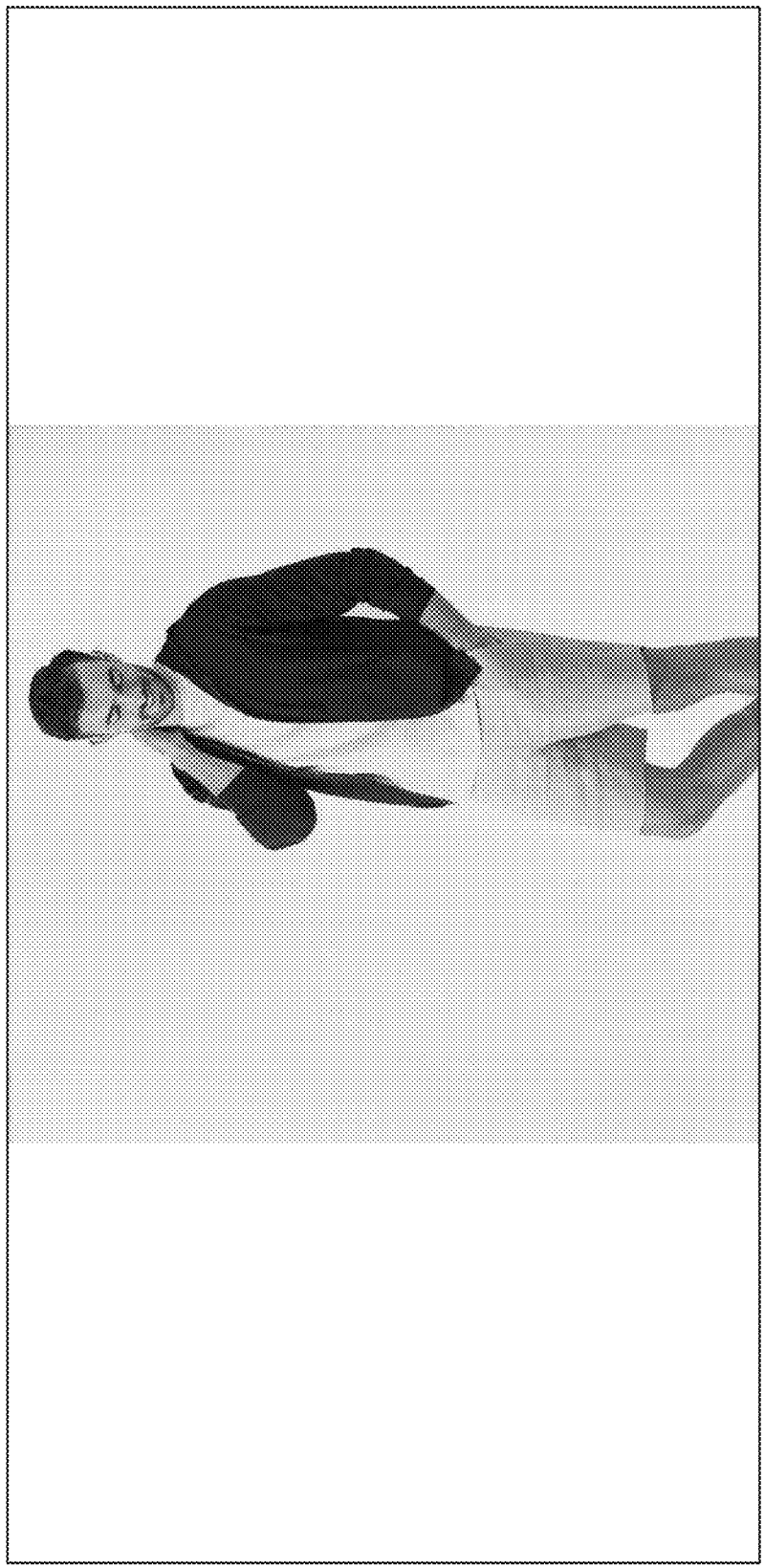
Figure 5E:
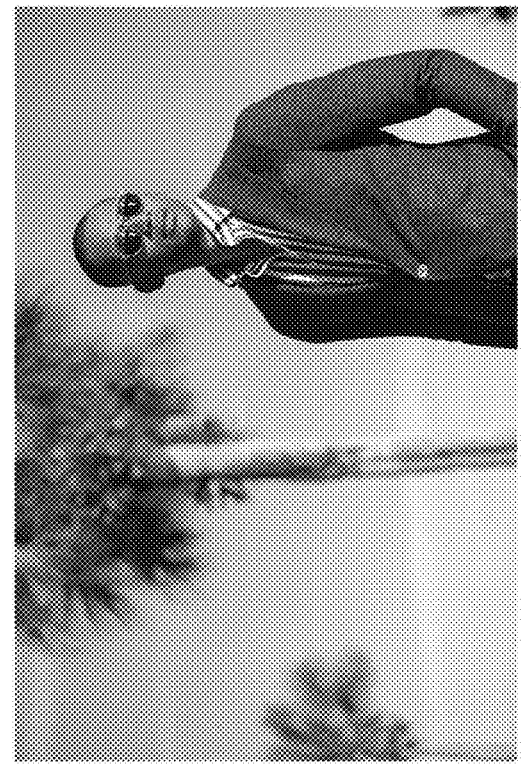
Figure 5F:
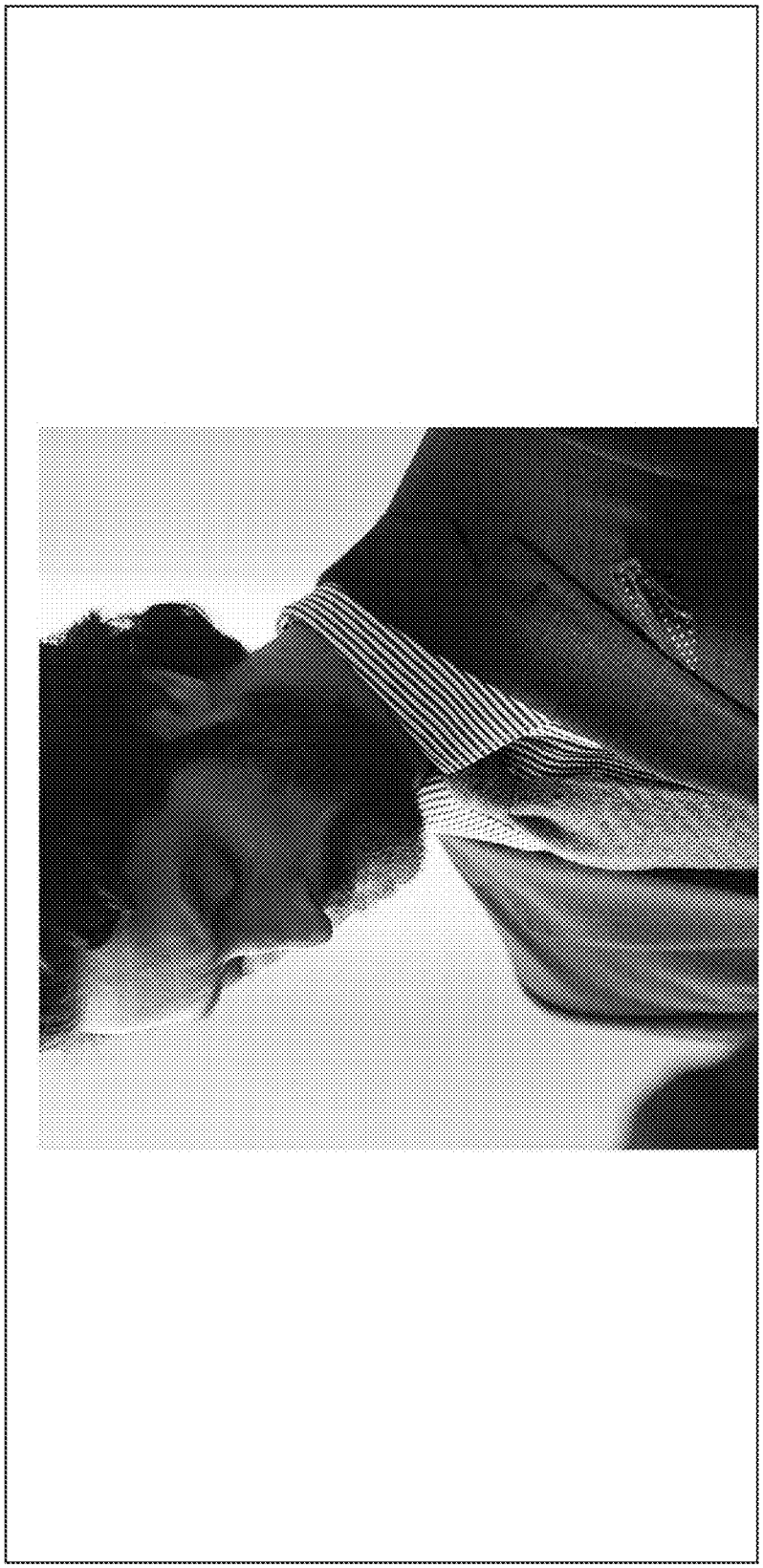

FIG. 5C shows a somewhat similar, formal look. Elements of the blue patterned jacket are provided, but further variation in styling and new variation in the base content is introduced. FIG. 5D continues this trend in increasing variation, providing seasonally-appropriate selections. The blue color is maintained. FIG. 5E is still seasonally appropriate, but it returns to elements more like those originally produced. For example, FIG. 5E includes a more formal blazer and a striped shirt similar to that shown in FIG. 5A. FIG. 5F is once again quite similar to the initial recommendation in terms of the jacket coloration and styling and the selection of the shirt. The variations thus are organized to include disparate recommendations from the recommendation engine that are presented in a manner that is not too jarring for the user. To the contrary, there is a semblance of formatting or style that is consistent throughout, based on the progression from a style board to a closely matching suit to increasing differences back to another closely matching suit.

The elements in the landing page may facilitate purchases. In certain example embodiments, an entire board may be purchased, items selected from the board may be purchased, an entire outfit from a picture may be purchased, etc. Individual items may be selected by clicking or depressing an article. A stylist may be consulted on any or all of these purchases. For example, once a person determines that a purchase is to be made, an "order this look" button or the like may be selected. This may trigger a match to a known article and/or a custom order. If the item is an accessory that cannot be customized, for example, the purchase may simply be made. On the other hand, the user may be able to order what is output "as is" or ask a stylist to further customize the article(s) based on output from the recommendation engine, what the stylist knows about the user, and/or specific user input. Thus, by scanning a QR code, it is possible to in essence enable shopping from a garment.

FIGS. 5G-5J show successive areas of another example formatted landing page that may be used in place of, or together with, the example shown in FIGS. 5A-5F, in accordance with certain example embodiments. In other words, the landing screen when the QR code is scanned may go to the FIG. 5G-5J example, or to the FIG. 5A-5F example. Both screens may be generatable in certain example embodiments, such that the screens are accessible from one another, regardless of which is the single initial landing page. In certain example embodiments, the content of the FIG. 5A-5F example may be added to the top or bottom of, or intermixed with, the content from the FIG. 5G-5J example.

Figure 5G:
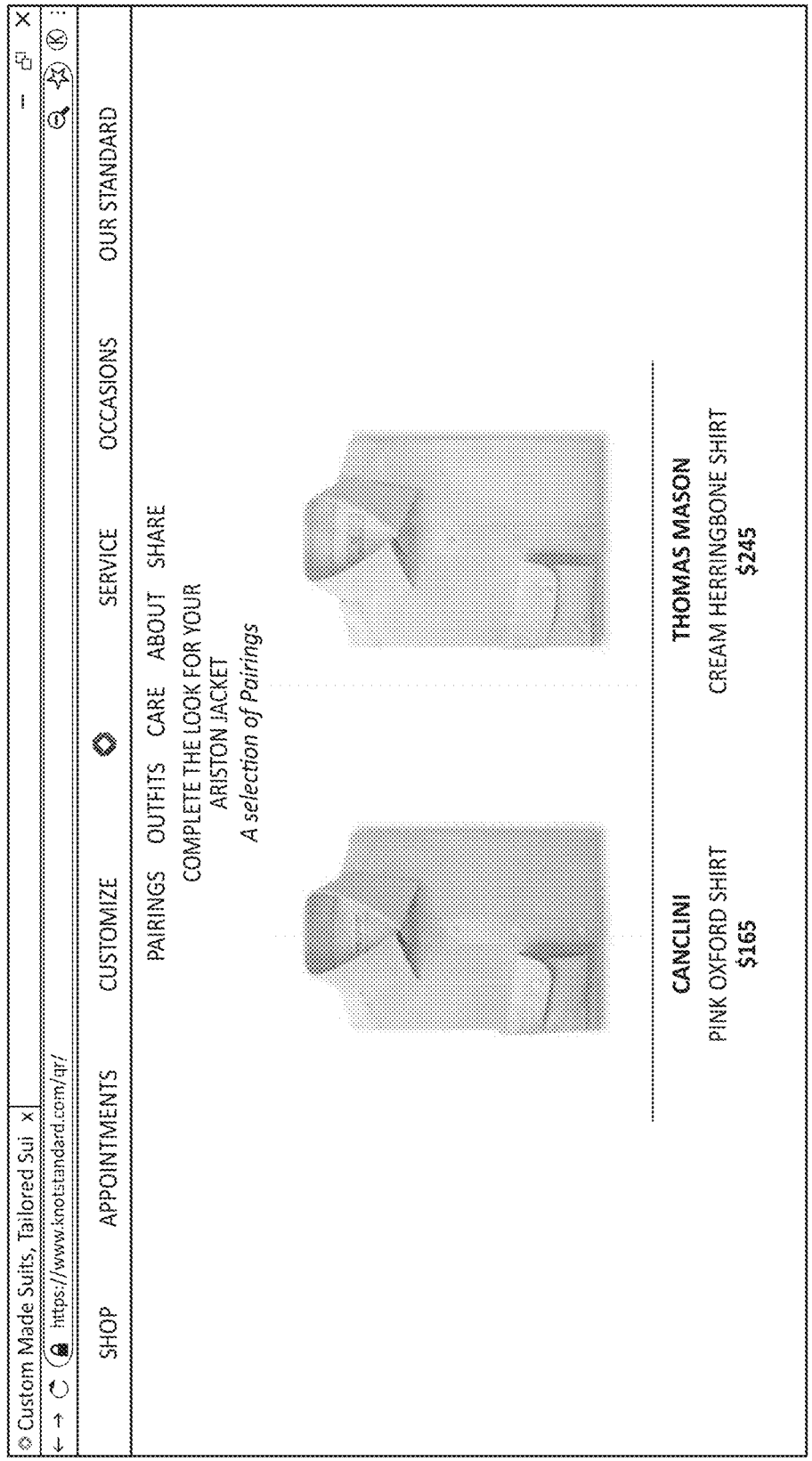
FIGS. 5G-5J show successive areas of another example formatted landing page that may be used in place of, or together with, the example shown in FIGS. 5A-5F, in accordance with certain example embodiments.
Figure 5H:
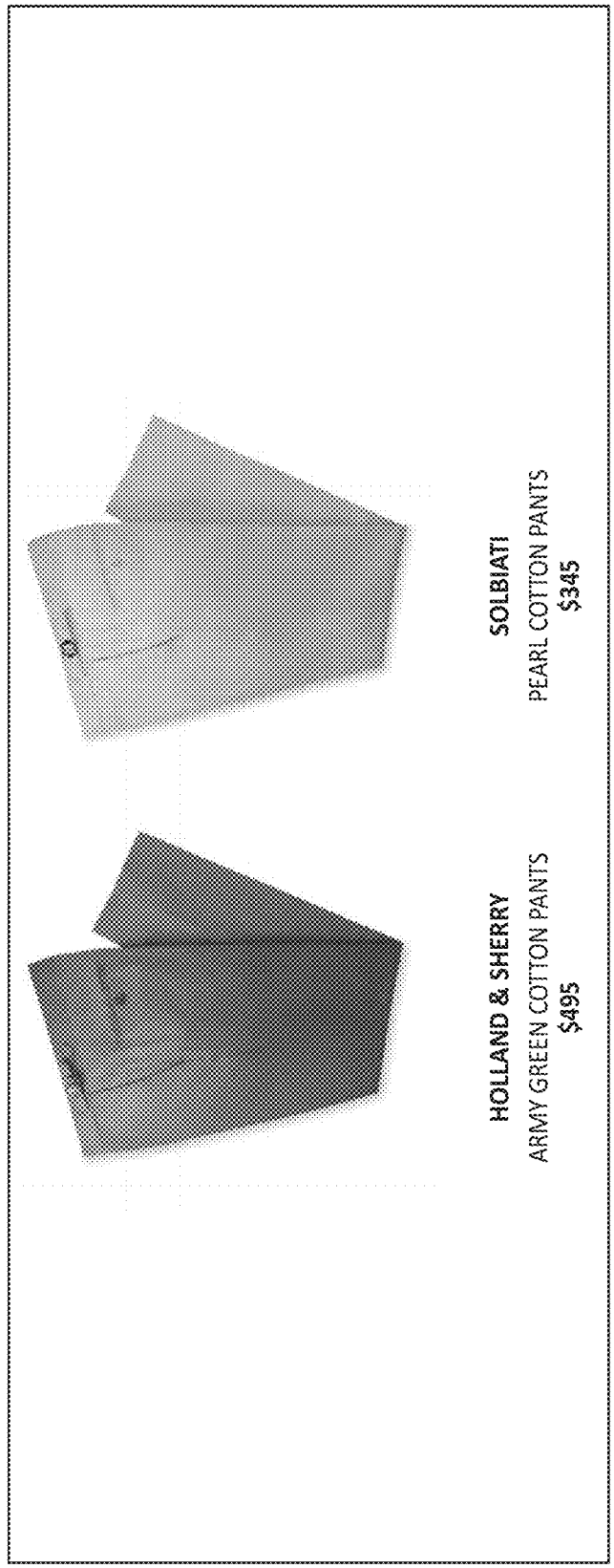
Figure 5I:
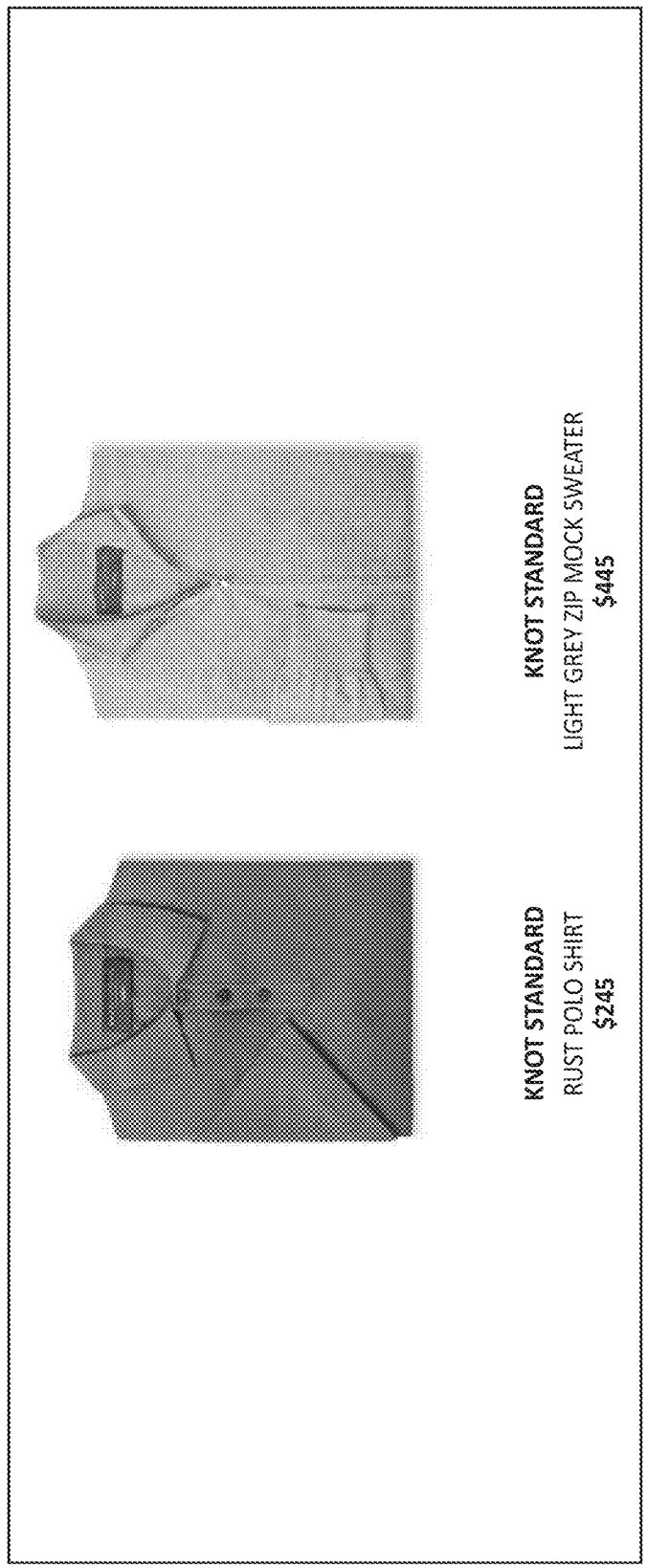
Figure 5J:
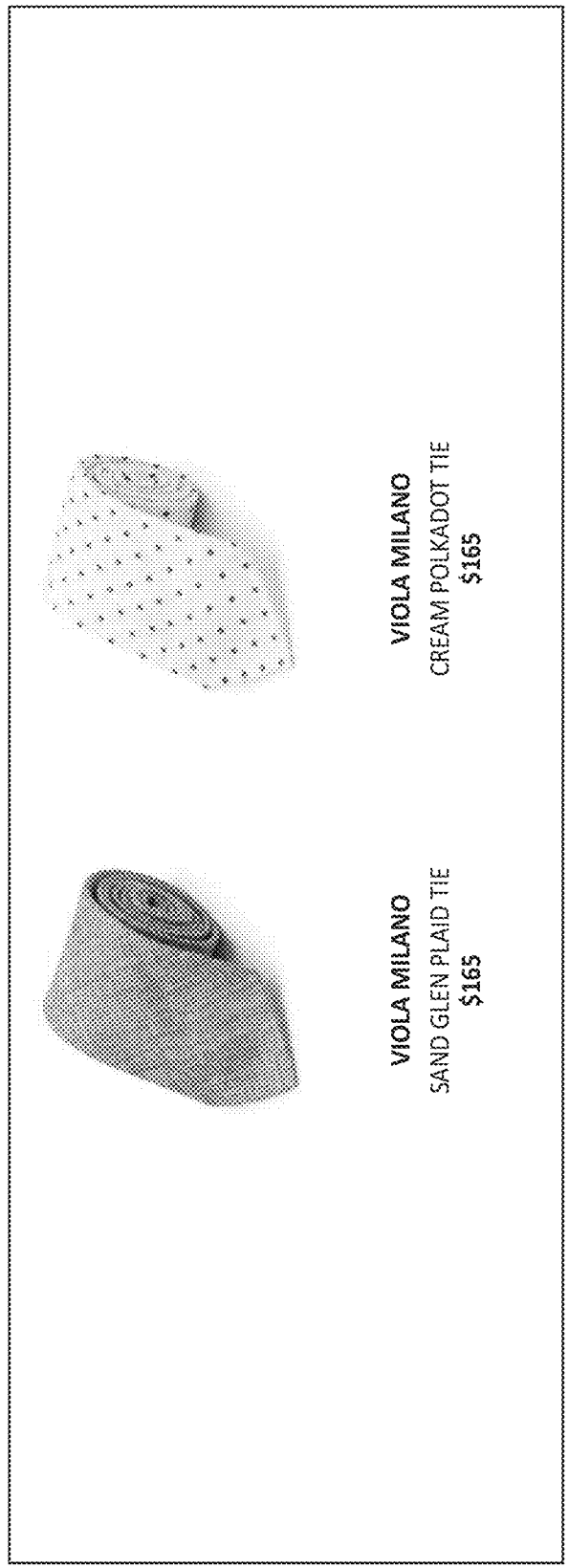

Referring more particularly to the content shown in FIGS. 5G-5J, items that "pair" with the article having the scanned QR code are shared. The pairings are generated by the recommendation engine in a manner similar to that described above. The pairings are organized by article type. FIG. 5G shows dress shirts, FIG. 5H shows slacks, FIG. 5I shows casual shirts, and FIG. 5J shows accessories. It will be appreciated that these categories are provided by way of example and without limitation. For instance, more or fewer categories may be provided in different examples. Separate categories may be provided for dress slacks and casual slack, for instance.

In certain example embodiments, the categories selected for display may depend on the output of the recommendation engine. For instance, if the recommendation engine produces output for a given category with matches below a threshold confidence value, that category may be omitted. For instance, there is no separate area for shoes. As an another example, if the recommendation engine produces output for more than a predefined number of categories, only the categories with the top matching results may be output. In certain example embodiments, similar categories may be grouped together if an insufficient number of results are generated. For example, if few casual shirts and sweaters are output from the recommendation engine, the top match(es) from each may be provided. See FIG. 5I in this regard. FIG. 5J shows ties as accessories, but it will be appreciated that in different instances other accessories may be provided with one or more ties, one or more accessory categories may be provided, etc.

Although two options are shown in each of the above-described categories, it will be appreciated that more or fewer options may be shown in different examples, e.g., depending on the strength of recommendation, predefined configuration settings, and/or the like. For instance, if there are many closely matching shirts but there are few closely matching slacks, the top n shirts and top m slacks may be selected, with n being greater than m, and with n and m both being predefined. The organizational structure of the FIG. 5G-5J example may be provided as a more simplistic, easier to use interface compared to that presented in the FIG. 5A-5F example. Items may be ordered from the FIG. 5G-5J example simply by clicking or otherwise selecting a given presented article, in a manner similar to that described above. In certain example embodiments, hovering over an item or taking a similar user interface action may cause an image of the article from which the QR code was scanned to be displayed in registration with the article hovered-over or otherwise designated, to enable a visualization of what the pairing might look like once assembled more fully.

FIG. 6 shows an example formatted care instructions page, in accordance with certain example embodiments. For mass-produced items, care instructions may be simple to provide and may simply match what is already provided on tags. For more boutique items, for custom items, and even to make mass-produced item care instructions manageable, a different approach may be used. For example, as noted above, the database "knows" about the product scanned. Bands of products thus may be defined, and these bands may be hierarchically arrangeable in certain example embodiments. For instance, it may in some instances be desirable to provide very broad bands, distinguishing between machine-washable linen and dry clean only wool. However, bands may be narrower or arranged hierarchically so that different types of wool (e.g., super $120s$ compared to super $140s$ wool or wool-silk blends) may have different care instructions associated therewith.

Yet more information may be known including, for example, base materials used at the garment level and customization information. This information may be used to define yet more bands and/or further care instructions. For instance, specific collars and basic design may imply a particular type of care, colors may imply machine wash instructions, and other care information may be based on, for example, weight of fabric (e.g., wool suit vs. top coat can determine dry clean and iron options), construction method, size (e.g., can imply a level of delicacy, etc.). The information that is output can be provided as a series of care instructions of decreasing levels of importance, These decreasing levels of importance can be tied to bands in some instances.

In certain example embodiments, care instructions may be selected from a plurality of bands based on which of those bands most closely matches attributes associated with the article of clothing, e.g., with attributes associated with the article of clothing being retrievable from a database accessible to the server. A plurality of hierarchical bands may be provided in instances, and a plurality of such bands accordingly may be selectable.

Figure 7A:
Figure 7B:
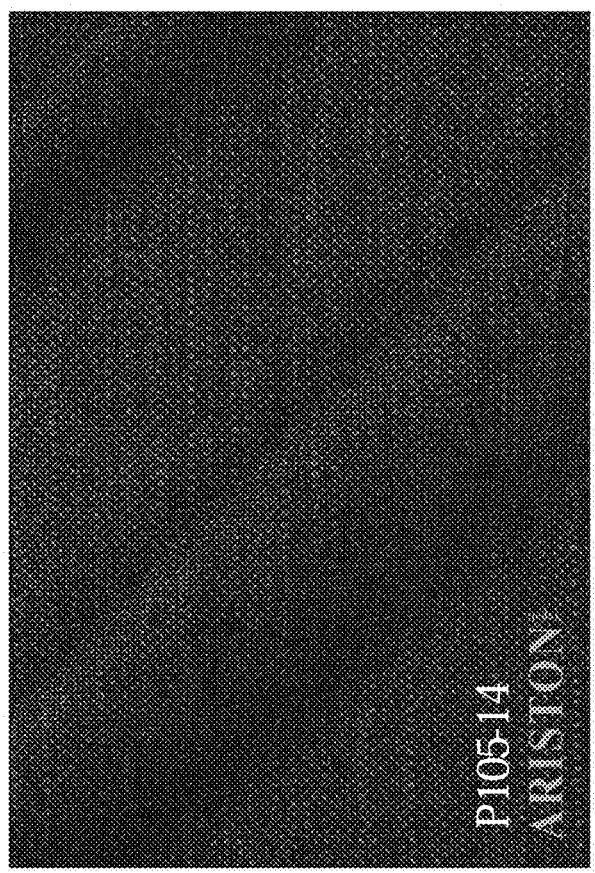

FIGS. 7A-7C successive areas of a formatted garment information page, in accordance with certain example embodiments. This "about" information may include information about customizations, who the user worked with, where the article was purchased, a history of fabric (e.g., sourcing information for specialty products such as those coming from rare materials like lotus flowers or organic/fair-trade sources, etc.), a swatch, and so on. FIG. 7A in particular includes information about the stylist who styled the scanned product and the showroom form which it was ordered and/or made. FIG. 7B includes the swatch as well as source information. FIG. 7C lists particular customizations for the jacket.

Figure 8A:
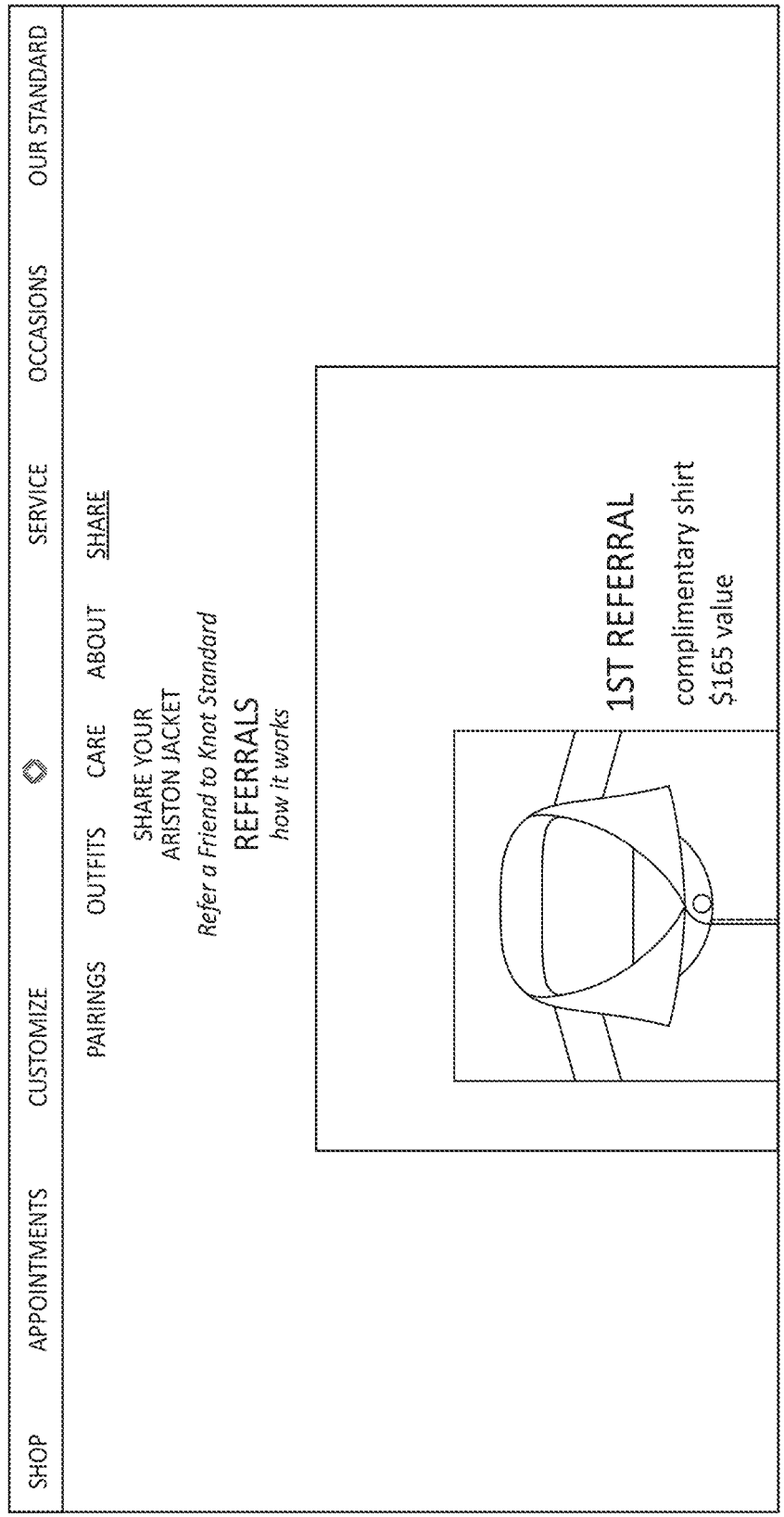
Figure 8B:
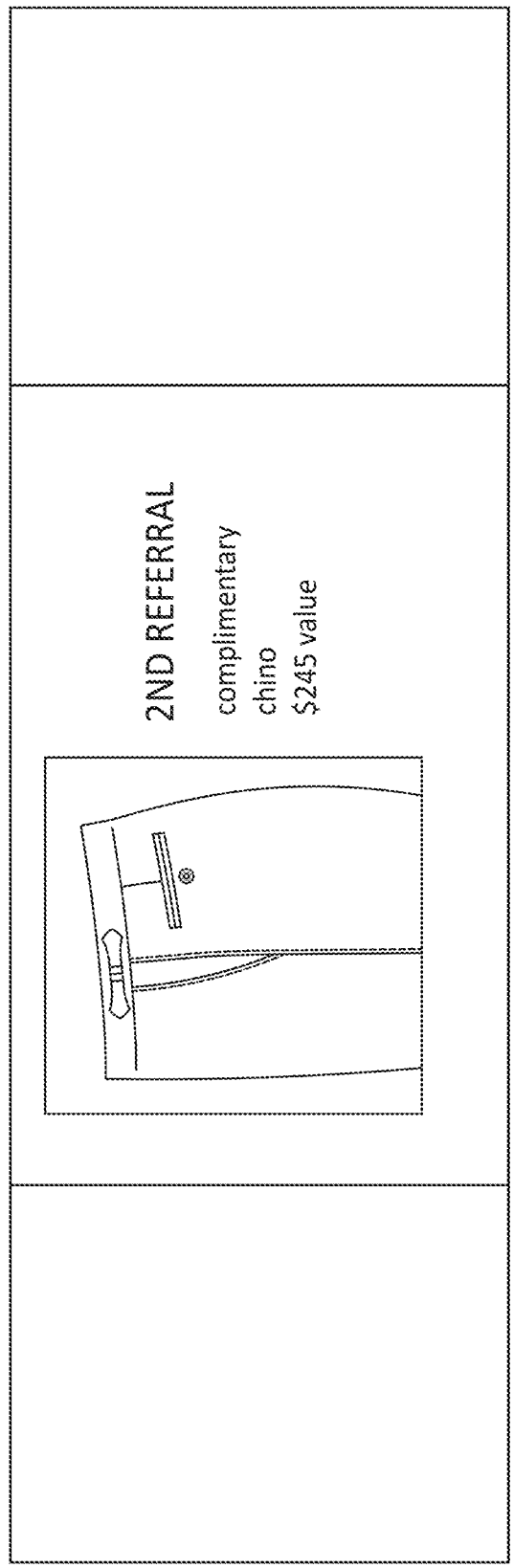
Figure 8C:
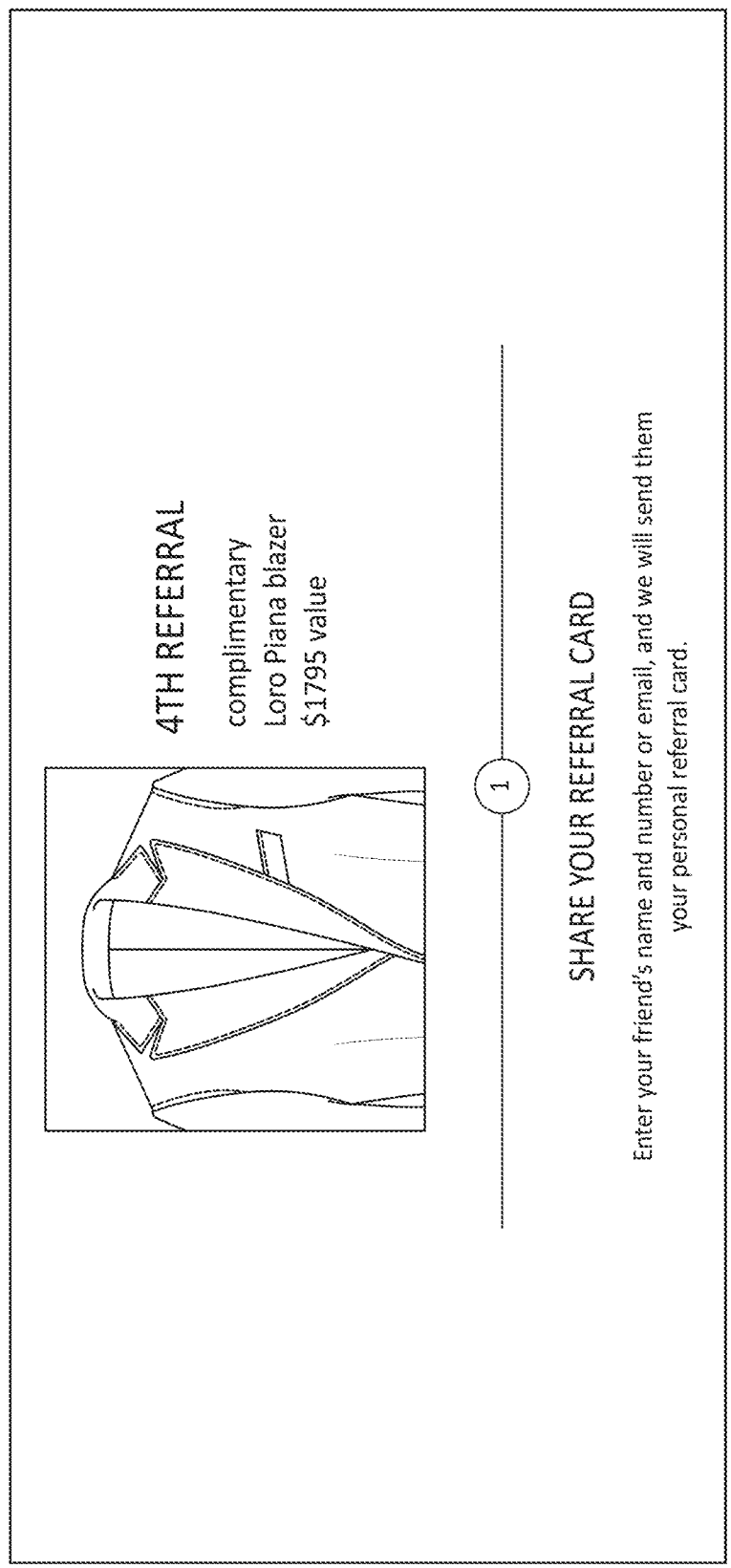
Figure 8D:
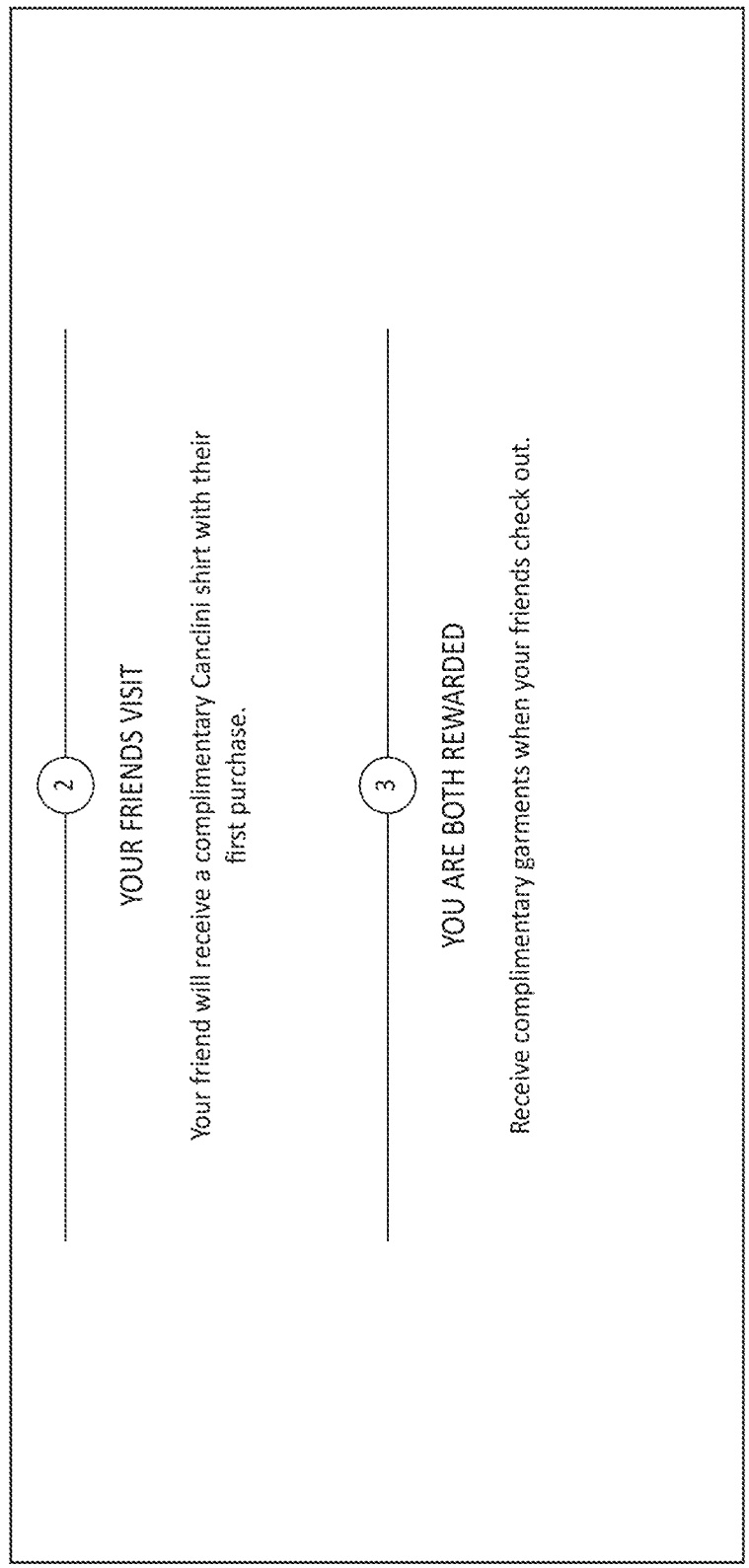

FIGS. 8A-8E show successive areas of a "share" page, in accordance with certain example embodiments. FIGS. 8A-8D establish parameters for rewarding the sharing user when certain conditions are met. FIG. 8E shows an example form that may be used to initiate a share or referral procedure. When the FIG. 8E form is completed, an introductory email or text message may be generated automatically. The introductory email or text message may include information about the services provided by the assignee. It also may include an image of the article from which the QR code was scanned, along with the identity (e.g., name, email, phone number, and/or the like) of the sharing user. Further information about customizations, fabric, and/or the like, may be provided in the email or text message and/or accessible from it (e.g., by clicking an embedded link). Similarly, information and/or a contact/calendaring system for setting up an appointment or the like may be shared in the email or text message or accessible from it. An email or text message with the referred user's contact information, information about the referring user, the referring user's article, and/or the like, may be sent to a lead management system, e.g., to initiate a follow-up conversation. Information about a recognized article of clothing may be sharable with another user in some instances.

FIG. 9 is a block diagram of a dynamic content presentation system in accordance with certain example embodiments. FIG. 9 shows an electronic device 902 (which may be a smartphone, tablet, laptop or the like) including processing resources including at least one processor 904 and a memory 906 coupled thereto. A hardware reader 908 (e.g., a camera suitable for scanning, taking a picture of, or otherwise reading a QR code or the like, an RFID or NFC reader, etc.) is controllable by the electronic device 902 in connection with a library of reader interface tools 910. The reader interface 910 may include, for example, an application programming interface (API) with callable modules and/or other program logic. A native operating system 912 helps manage the reader interface 910 and also supports a browser module 914 in certain example embodiments. For instance, many smartphones operate browsers or the like. In certain example embodiments, the memory 906 may store a stand-alone software application or program (e.g., an app) that performs some or all of the functionality described herein. The reader 908 may scan a QR code on an article of clothing, for instance, and the reader interface 910 may help decode it, revealing a URL or other information that instructs the native OS 912 to start up the browser module 914 (or the standalone application) based on the link information.

The electronic device 902 communicates with the presentation server 916 over a network connection (e.g., an Internet connection) or the like. The presentation server 916 includes its own processing resources, including at least one processor 918 and memory 920. The memory 920 stores a display controller module 922, which is responsible for generating the displays dispatched to and displayable on the electronic device 902 (e.g., via the browser 914 or the dedicated app). The display controller module 922 may, for example, format output in accordance with display templates 924 using output from the recommendation system (or recommendation engine) 926 and/or the loyalty system(s) 928a-928n. In this regard, the presentation server 916 may interface with the recommendation system 926 via the recommender interface 930, and may interface with the loyalty system(s) 928a-928n using one or more loyalty system interfaces 932. These interfaces may include APIs, web services, and/or other program code callable programmatically. Each loyalty system may include its own respective loyalty system interface in certain example embodiments.

The recommendation system 926 in this example includes its own processing resources, including at least one processor 934 and memory 936. The memory may store code configured to operate as an inference engine 938 (for example) and a backend database 940 storing information about user preferences, prior purchases, etc., may be stored locally. It will be appreciated that the recommendation system 926 and the presentation server 916 may be fully or partially hosted on the same computing system in certain example embodiments.

The loyalty systems 928a-928n may be managed separately from the presentation server 916 and/or the recommendation system 926 in certain example embodiments. For example, the loyalty systems 928a-928n may be managed by stores or retailers, clothing manufacturers or brands, etc. The loyalty systems 928a-928n may provide information about prior purchases, user profiles, etc., as described above.

The display controller 922, as noted above, may receive information from the recommendation system 926 and/or the loyalty systems 928a-928n and package it for presentation to the user via the electronic device 902. This may include formatting combined output using the display templates 924, custom art or imagery retrieved from the backend database 926 or elsewhere, etc.

In certain example embodiments, a method of dynamic content presentation is provided. Data extracted from a code provided to an article of clothing is received. Responsive to the receiving, a user interface is automatically and programmatically generated for display and includes care instructions for the article of clothing and one or more recommendations of one or more other articles of clothing that match with the article of clothing to which the code is provided, based on the data. An electronic device to display the user interface (e.g., via a browser, dedicated app, or the like). In certain example embodiments, the article of clothing may be a custom article and the user interface may include an image thereof taken prior to delivery. The user interface may include a webpage formatted so that the recommendation(s) is/are provided in a predefined template in some instances. Multiple recommendations may be provided, e.g., with at least some of the recommendations being presented as a series of one or more images and/or videos retrieved from a library stored to a non-transitory computer readable storage medium and/or generated using 3D modelling; organized into predefined categories of garments, with a predetermined number of recommendations being provided in each category, where recommendations for similar categories are merged into a common category, provided that a threshold number of trustable recommendations are not generated; etc. Certain example embodiments similarly provide a non-transitory computer readable storage medium storing instructions that, when executed by at least one processor perform functionality corresponding to this approach.

Although certain example embodiments have been described in connection with QR codes sewn into articles of clothing, it will be appreciated that other code types may be associated with the articles in other ways. For example, 2D or 3D bar codes, RFID tags, and/or the like may be used in place of QR codes. Such codes may be sewn into the fabric such as depicted in FIG. 1 in some instances. In other instances, the code or the like may be printed on a label that may be sewn into the garment. In still other instances, the code or the like may be screen-printed or otherwise applied to the garment.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A dynamic content presentation system, comprising:
   a reader configured to read a code provided to a human-accessible interior portion of a fully-constructed bespoke article of clothing, the code being in a format that is not understandable to humans without the aid of technology;
   a transceiver configured to transmit the read code to a sever; and
   processing resources, including at least one processor and a memory coupled thereto, the processing resources being configured to present a user interface;
   wherein the user interface is configured to display data received from the server based on and in response to the read code being read by the reader and transmitted to the server by the transceiver, the data being formatted into output including care instructions for the bespoke article of clothing and one or more recommendations of one or more other articles of clothing that match with the bespoke article of clothing to which the code is provided, the output being arranged into multiple discrete display areas such that a first discrete display area includes the care instructions for the bespoke article of clothing and a second discrete display area includes the one or more recommendations of one or more other articles of clothing that match with the bespoke article of clothing, the first and second discrete display areas being different from one another, and wherein a total area of the output is greater than a total area of the code, the code being approximately thumb-nail sized and being usable in lieu of a larger tag or label to enable information about the bespoke article of clothing to be conveyed to a human after the bespoke article of clothing is fully constructed.

2. The system of claim 1, wherein the code is a QR code.

3. The system of claim 1, wherein the code is sewn into or printed onto the article of clothing itself.

4. The system of claim 1, wherein the reader is a camera provided to a smart device.

5. The system of claim 1, wherein the processing resources are incorporated into a smartphone, tablet, or computer.

6. The system of claim 1, wherein the user interface is provided in connection with a webpage, the webpage being formatted so that the recommendation(s) is/are provided in a predefined template.

7. The system of claim 1, wherein multiple recommendations are provided, at least some of the recommendations being presented as a series of one or more images and/or videos retrieved from a library stored to a non-transitory computer readable storage medium and/or generated using 3D modelling.

8. The system of claim 7, wherein at least one of the recommendations is presented as a style board incorporating images of plural products.

9. The system of claim 1, wherein the code is a QR code sewn into or printed onto the article of clothing itself,
wherein the reader is a camera provided to a smart device and the processing resources are integrated into the smart device,
wherein the user interface is provided in connection with a website, the recommendation(s) being provided in a predefined template, and
wherein the discrete display areas are different webpages in the website.

10. The system of claim 9, wherein plural recommendations are provided, the plural recommendations being organized into predefined categories of garments, with a predetermined number of recommendations being provided in each category.

11. The system of claim 10, wherein recommendations for similar categories are merged into a common category for display, provided that a threshold number of trustable recommendations are not generated.

12. The system of claim 1, wherein the user interface is further configured to display customization, material sourcing, and/or construction, information about the article of clothing.

13. The system of claim 1, wherein plural recommendations are provided, the plural recommendations being organized into predefined categories of garments, with a predetermined number of recommendations being provided in each category.

14. The system of claim 13, wherein recommendations for similar categories are merged into a common category, provided that a threshold number of trustable recommendations are not generated.

15. A method of dynamic content presentation, the method comprising:
receiving data extracted from a code provided to a human-accessible interior portion of a fully-constructed article of clothing;
responsive to the receiving, automatically and programmatically generating for display a user interface including a plurality of recommendations of one or more other articles of clothing that match with the article of clothing to which the code is provided, based on the data; and
causing an electronic device to display the user interface,
wherein the plural recommendations are organizable into predefined categories of garments for display via the user interface, a predetermined number of recommendations being designated for each category, and
wherein recommendations for similar categories are merged into a common category for display via the user interface, provided that a threshold number of trustable recommendations are not generated for one or more of the similar categories.

16. The method of claim 15, wherein the user interface includes a webpage formatted so that the recommendation(s) is/are provided in a predefined template.

17. The method of claim 15, wherein multiple recommendations are provided, at least some of the recommendations being presented as a series of one or more images and/or videos retrieved from a library stored to a non-transitory computer readable storage medium and/or generated using 3D modelling.

18. The method of claim 15, wherein the user interface includes a webpage formatted to include care instructions for the article of clothing, the article of clothing being a bespoke article of clothing, the care instructions specifying how the bespoke article of clothing cared for including how the bespoke article of clothing should be cleaned.

19. The method of claim 18, wherein the user interface includes an image of the bespoke article of clothing taken prior to delivery.

20. A non-transitory computer readable storage medium storing instructions that, when executed by at least one processor perform operations corresponding to claim 15.

* * * * *